US012775697B2

(12) United States Patent
Engels et al.

(10) Patent No.: US 12,775,697 B2
(45) **Date of Patent: *Oct. 27, 2026**

(54) MALWARE MITIGATION BASED ON RUNTIME MEMORY ALLOCATION

(71) Applicant: Sophos Limited, Abingdon (GB)

(72) Inventors: Lute Edwin Engels, Zuidwolde (NL); Mark Willem Loman, Delden (NL); Alexander Vermaning, Enschede (NL); Erik Jan Loman, Hengelo (NL); Victor Marinus Johann Simon van Hillo, Delden (NL)

(73) Assignee: Sophos Limited, Abingdon (GB)

( * ) Notice: Subject to any disclaimer, the term of this patent is extended or adjusted under 35 U.S.C. 154(b) by 15 days.

This patent is subject to a terminal disclaimer.

(21) Appl. No.: 19/030,113

(22) Filed: Jan. 17, 2025

(65) Prior Publication Data

US 2025/0173429 A1 May 29, 2025

Related U.S. Application Data

(63) Continuation of application No. 18/543,118, filed on Dec. 18, 2023, now Pat. No. 12,210,617, which is a (Continued)

(51) Int. Cl.
*G06F 21/55* (2013.01)
*G06F 9/50* (2006.01)
(Continued)

(52) U.S. Cl.
CPC ............ *G06F 21/55* (2013.01); *G06F 9/5016* (2013.01); *G06F 12/023* (2013.01); *G06F 12/1416* (2013.01); *G06F 12/1441* (2013.01); *G06F 12/1458* (2013.01); *G06F 21/56* (2013.01); *G06F 21/60* (2013.01); *G06F 21/71* (2013.01)

(58) Field of Classification Search
CPC ............... G06F 12/023; G06F 12/0292; G06F 12/1416; G06F 12/1441; G06F 12/1458; G06F 12/1491; G06F 21/52; G06F 21/55; G06F 21/56; G06F 21/60; G06F 21/71; G06F 9/5016
See application file for complete search history.

(56) References Cited

U.S. PATENT DOCUMENTS

| | | | |
|---|---|---|---|
| 8,181,244 | B2 | 5/2012 | Boney |
| 8,201,243 | B2 | 6/2012 | Boney |

(Continued)

OTHER PUBLICATIONS

Nikiforakis, Nick et al., "HeapSentry: Kernel-Assisted Protection against Heap Overflows", Detection of Intrusions and Malware, and Vulnerability Assessment, Lecture Notes in Computer Science, vol. 7967 (Springer 2013) NPL-946 2013 , 20 pages.

(Continued)

*Primary Examiner* — Theodore C Parsons
(74) *Attorney, Agent, or Firm* — Strategic Patents, P.C.

(57) ABSTRACT

A compute instance is instrumented to detect certain kernel memory allocation functions, in particular functions that allocate heap memory and/or make allocated memory executable. Dynamic shell code exploits can then be detected when code executing from heap memory allocates additional heap memory and makes that additional heap memory executable.

20 Claims, 7 Drawing Sheets

Related U.S. Application Data continuation of application No. 18/094,636, filed on Jan. 9, 2023, now Pat. No. 11,880,453, which is a continuation of application No. 16/681,919, filed on Nov. 13, 2019, now Pat. No. 11,550,900.

(60) Provisional application No. 62/768,582, filed on Nov. 16, 2018.

(51) Int. Cl.

| | |
|---|---|
| ***G06F 12/02*** | (2006.01) |
| ***G06F 12/14*** | (2006.01) |
| ***G06F 21/56*** | (2013.01) |
| ***G06F 21/60*** | (2013.01) |
| ***G06F 21/71*** | (2013.01) |

(56) References Cited

U.S. PATENT DOCUMENTS

| | | | | |
|---|---|---|---|---|
| 8,418,250 | B2 | 4/2013 | Morris et al. | |
| 8,719,932 | B2 | 5/2014 | Boney | |
| 8,726,389 | B2 | 5/2014 | Morris et al. | |
| 8,763,123 | B2 | 6/2014 | Morris et al. | |
| 8,856,505 | B2 | 10/2014 | Schneider | |
| 9,413,721 | B2 | 8/2016 | Morris et al. | |
| 9,578,045 | B2 | 2/2017 | Jaroch et al. | |
| 9,973,531 | B1 * | 5/2018 | Thioux | H04L 63/1466 |
| 10,257,224 | B2 | 4/2019 | Jaroch et al. | |
| 10,284,591 | B2 | 5/2019 | Giuliani et al. | |
| 10,599,844 | B2 | 3/2020 | Schmidtler et al. | |
| 2003/0177472 | A1 * | 9/2003 | de Jong | G06F 9/5016 717/133 |
| 2019/0213144 | A1 * | 7/2019 | Li | G06F 11/00 |
| 2023/0161873 | A1 | 5/2023 | Engels et al. | |
| 2024/0220609 | A1 | 7/2024 | Engels et al. | |

OTHER PUBLICATIONS

Yu, Ding et al., "Heap Taichi: Exploiting Memory Allocation Granularity in Heap—Spraying Attacks", Computer Security Applications Conference. (ACM 2010) NPL-947 2010 , 10 pages.

"U.S. Appl. No. 16/681,919 Non-Final Office Action mailed Dec. 20, 2021", NPL-948 , 13 pages.

"U.S. Appl. No. 16/681,919 Notice of Allowance mailed Apr. 14, 2022", NPL-949 , 8 pages.

"U.S. Appl. No. 16/681,919 Notice of Allowance mailed Aug. 9, 2022", NPL-950 , 8 pages.

"U.S. Appl. No. 16/681,919 Notice of Allowance mailed Dec. 1, 2022", NPL-951 , 8 pages.

"U.S. Appl. No. 18/094,636 Notice of Allowance mailed Sep. 7, 2023", NPL-1094 , 13 pages.

"U.S. Appl. No. 18/543,118 Notice of Allowance mailed Sep. 18, 2024", , 9 pages.

* cited by examiner

500

MALWARE MITIGATION BASED ON RUNTIME MEMORY ALLOCATION

CROSS-REFERENCE TO RELATED APPLICATIONS

This application is a continuation of U.S. patent application Ser. No. 18/543,118 filed on Dec. 18, 2023, which is a continuation of U.S. patent application Ser. No. 18/094,636 filed on Jan. 9, 2023 (now U.S. Pat. No. 11,880,453), which is a continuation of U.S. patent application Ser. No. 16/681,919 filed on Nov. 13, 2019 (now U.S. Pat. No. 11,550,900), which claims the benefit of priority of U.S. Provisional Patent Application No. 62/768,582 filed on Nov. 16, 2018, where the entire contents of each of the foregoing are hereby incorporated herein by reference.

FIELD

The present disclosure generally relates to a threat management system and threat management techniques, and more particularly to malware mitigation based on runtime memory allocation.

BACKGROUND

A known malware exploit deploys shellcode by deploying executable code within heap memory. There remains a need for improved detection techniques that can detect and mitigate this type of exploit.

SUMMARY

A compute instance is instrumented to detect certain kernel memory allocation functions, in particular functions that allocate heap memory and/or make allocated memory executable. Dynamic shell code exploits can then be detected when code executing from heap memory allocates additional heap memory and makes that additional heap memory executable.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

As described herein, a threat management system may use a Sensor, Events, Analytics, and Response (SEAR) approach to protect enterprises against cybersecurity threats.

Figure 1:
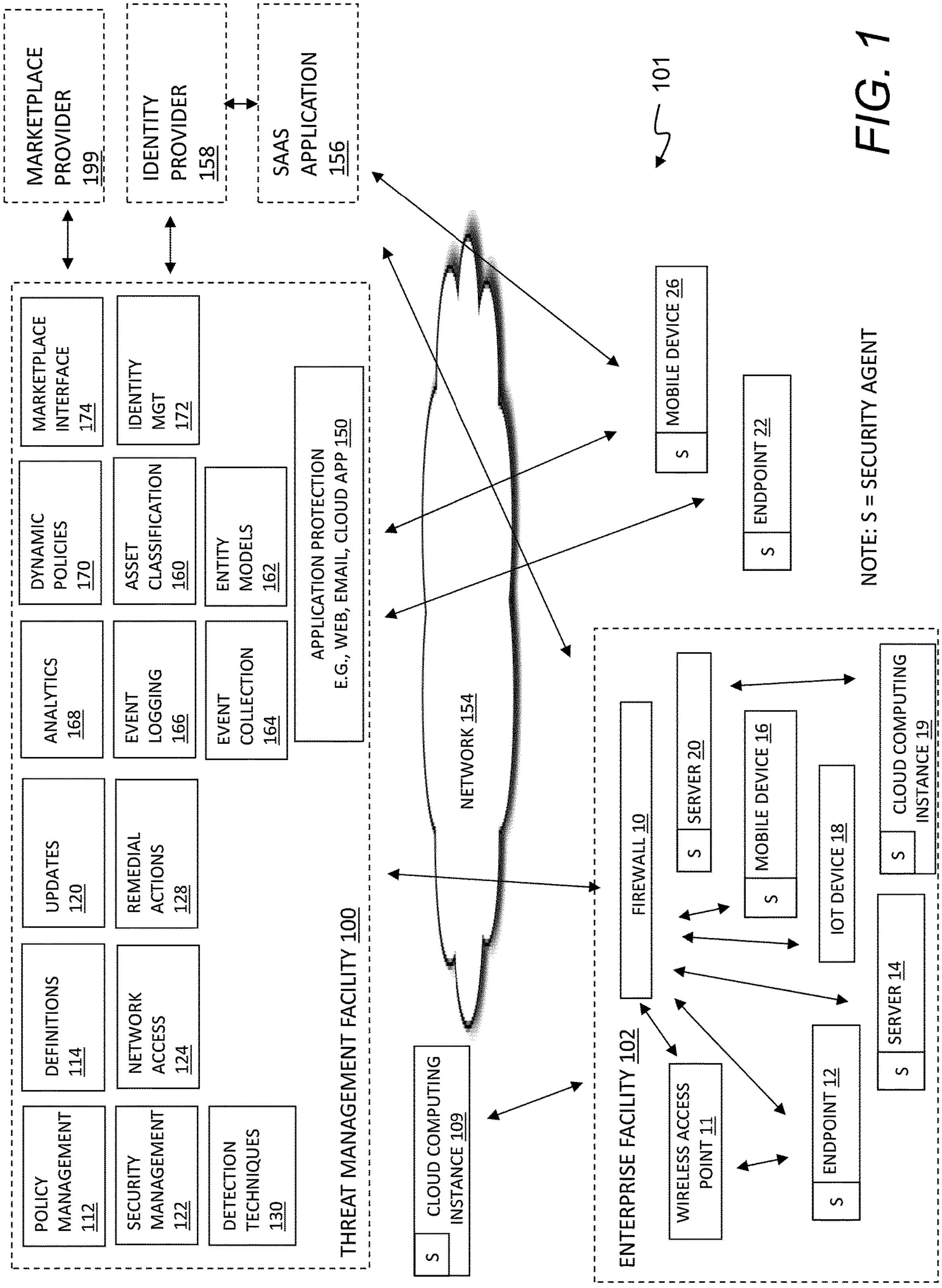
FIG. 1 depicts a block diagram of a threat management system.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks, and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications, and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, application protection 150, asset classification facility 160, entity model 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. A marketplace provider 199 may be selected from a number of providers in a marketplace of providers that are available for integration or collaboration via the marketplace interface facility 174. A given marketplace provider 199 may use the marketplace interface facility 174 even if not engaged or enabled from or in a marketplace. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications, and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, IOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models 162 may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities, and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility. Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the security management facility 122 may take any steps or deploy any measures suitable for addressing a detection of a threat, potential threat, policy violation or other event, code, or activity that might compromise security of a computing instance 10-26 or the enterprise facility 102.

Figure 2:
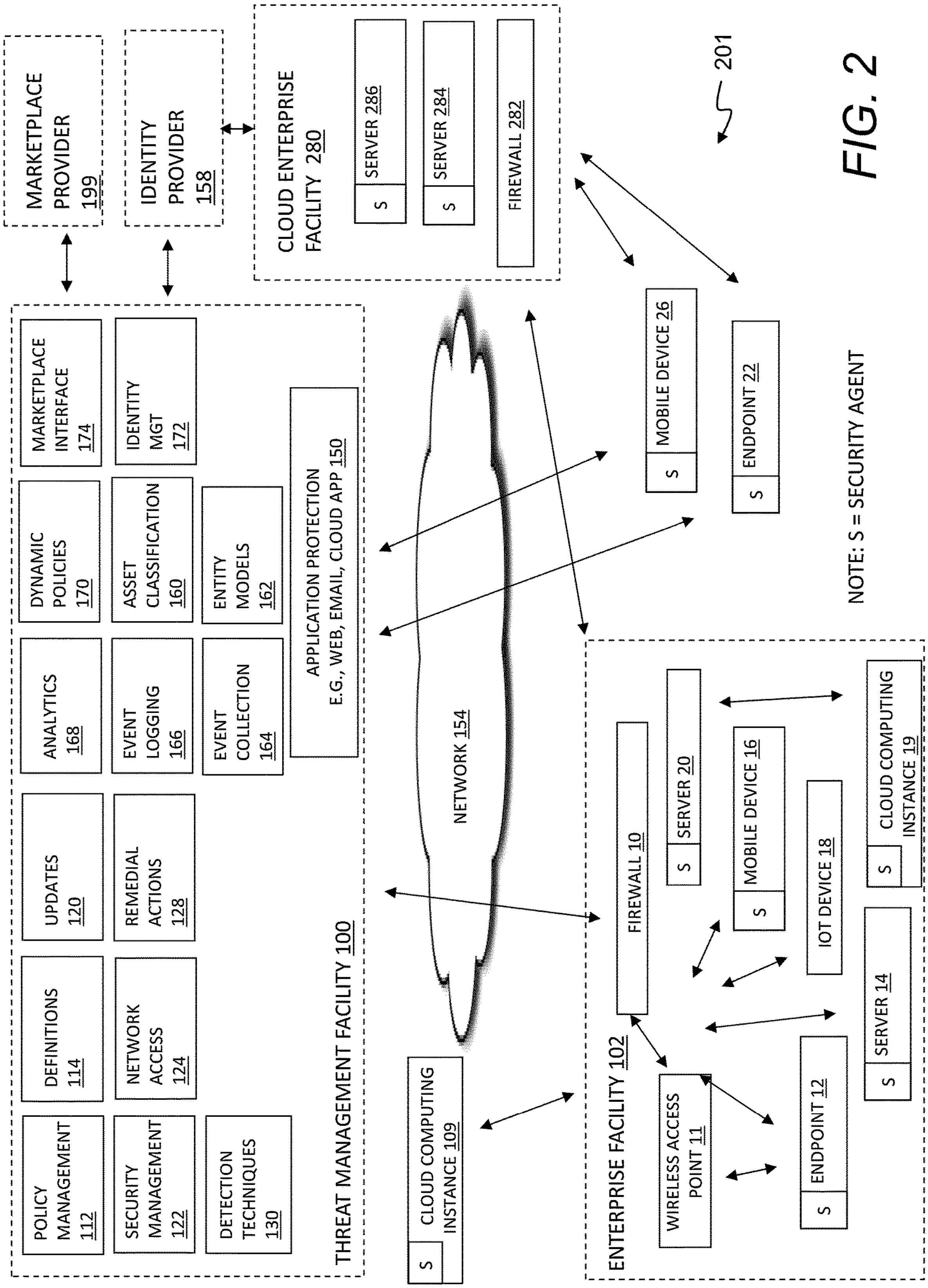
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Having provided an overall context for threat detection, the description now turns to a brief discussion of an example of a computer system that may be used for any of the entities and facilities described above.

Figure 3:
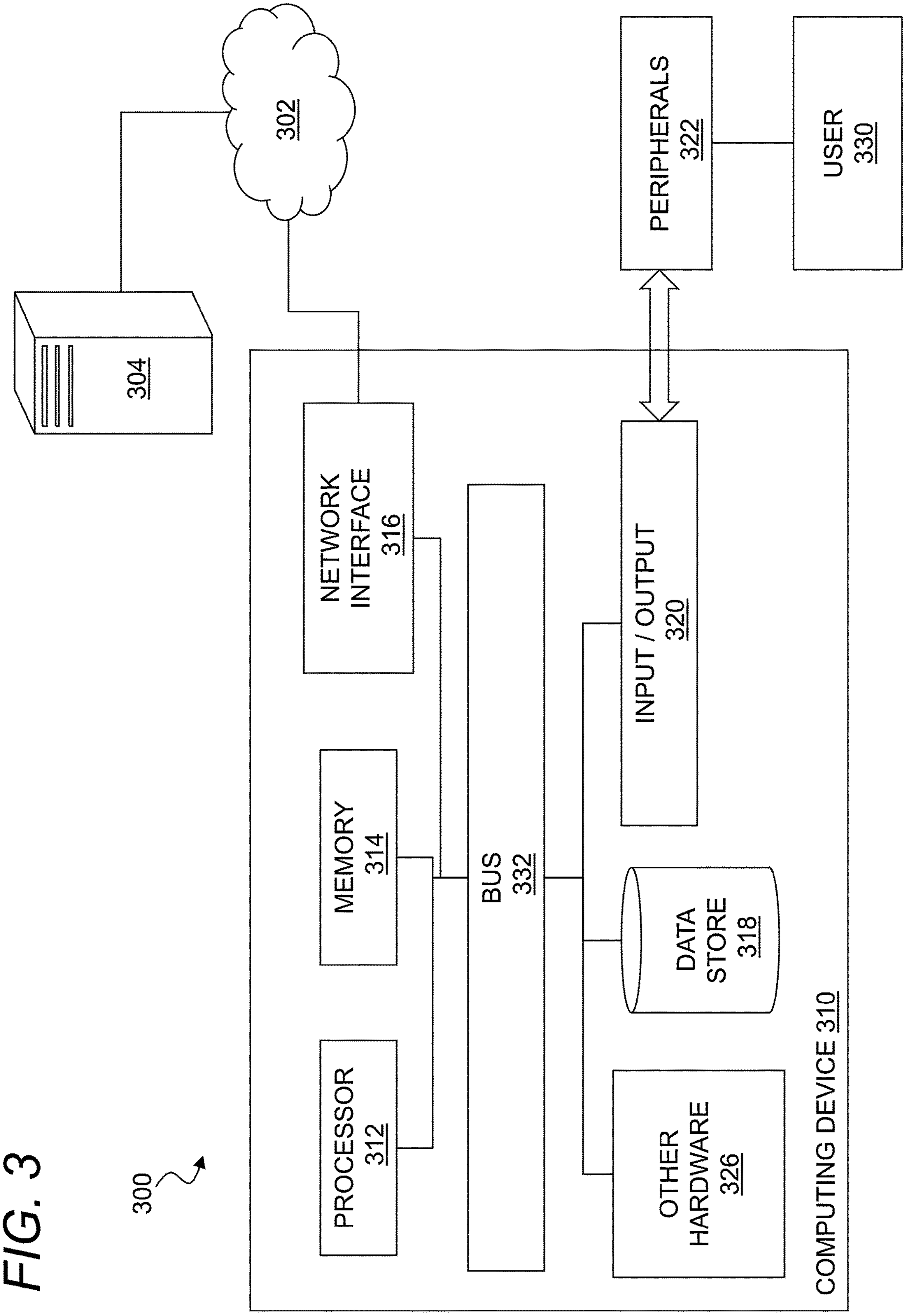
FIG. 3 illustrates a system for forensic analysis for computer processes.

FIG. 3 illustrates a computer system. In general, the computer system 300 may include a computing device 310 connected to a network 302, e.g., through an external device 304. The computing device 310 may be or include any type of network endpoint or endpoints as described herein, e.g., with reference to FIG. 1 above. For example, the computing device 310 may include a desktop computer workstation. The computing device 310 may also or instead be any other device that has a processor and communicates over a network 302, including without limitation a laptop computer, a desktop computer, a personal digital assistant, a tablet, a mobile phone, a television, a set top box, a wearable computer (e.g., watch, jewelry, or clothing), a home device (e.g., a thermostat, humidistat, appliance or a home appliance controller), just as some examples. The computing device 310 may also or instead include a server, or it may be disposed on a server or within a virtual or physical server farm.

The computing device 310 may be any of the entities in the threat management environment described above with reference to FIG. 1. For example, the computing device 310 may be a server, a client an enterprise facility, a threat management facility, or any of the other facilities or computing devices described therein. In certain aspects, the computing device 310 may be implemented using hardware (e.g., in a desktop computer), software (e.g., in a virtual machine or the like), or a combination of software and hardware (e.g., with programs executing on the desktop computer), and the computing device 310 may be a standalone device, a device integrated into another entity or device, a platform distributed across multiple entities, or a virtualized device executing in a virtualization environment.

The network 302 may include any network or combination of networks, such as one or more data networks or internetworks suitable for communicating data and control information among participants in the computer system 300. The network 302 may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 300. The network 302 may also include a combination of data networks, and need not be limited to a strictly public or private network.

The external device 304 may be any computer or other remote resource that connects to the computing device 310 through the network 302. This may include threat management resources such as any of those contemplated above, gateways or other network devices, remote servers or the like containing content requested by the computing device 310, a network storage device or resource, a device hosting content, or any other resource or device that might connect to the computing device 310 through the network 302.

The computing device 310 may include a processor 312, a memory 314, a network interface 316, a data store 318, and one or more input/output interfaces 320. The computing device 310 may further include or be in communication with one or more peripherals 322 and other external input/output devices 224.

The processor 312 may be any as described herein, and in general may be capable of processing instructions for execution within the computing device 310 or computer system 300. The processor 312 may include a single-threaded processor, a multi-threaded processor, a multi-core processor, or any other processor, processing circuitry, or combination of the foregoing suitable for processing data and instructions as contemplated herein. The processor 312 may be capable of processing instructions stored in the memory 314 or on the data store 318.

The memory 314 may store information within the computing device 310 or computer system 300. The memory 314 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 314 may store program instructions, program data, executables, and other software and data useful for controlling operation of the computing device 310 and configuring the computing device 310 to perform functions for a user. The memory 314 may include a number of different stages and types for different aspects of operation of the computing device 310. For example, a processor may include on-board memory and/or cache for faster access to certain data or instructions, and a separate, main memory or the like may be included to expand memory capacity as desired.

The memory 314 may, in general, include a non-volatile computer readable medium containing computer code that, when executed by the computing device 310 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 314 is depicted, it will be understood that any number of memories may be usefully incorporated into the computing device 310. For example, a first memory may provide non-volatile storage such as a disk drive for permanent or long-term storage of files and code even when the computing device 310 is powered down. A second memory such as a random-access memory may provide volatile (but higher speed) memory for storing instructions and data for executing processes. A third memory may be used to improve performance by providing even higher speed memory physically adjacent to the processor 312 for registers, caching and so forth.

The network interface 316 may include any hardware and/or software for connecting the computing device 310 in a communicating relationship with other resources through the network 302. This may include connections to resources such as remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 310 and other devices. The network interface 316 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 316 may include any combination of hardware and software suitable for coupling the components of the computing device 310 to other computing or communications resources. By way of example and not limitation, this may include electronics for a wired or wireless Ethernet connection operating according to the IEEE 802.11 standard (or any variation thereof), or any other short or long range wireless networking components or the like. This may also or instead include hardware for short range data communications such as Bluetooth or an infrared transceiver, which may be used to couple to other local devices, or to connect to a local area network or the like that is in turn coupled to a data network 302 such as the Internet. This may also or instead include hardware/software for a WiMax connection or a cellular network connection (using, e.g., CDMA, GSM, LTE, or any other suitable protocol or combination of protocols). The network interface 316 may be included as part of the input/output interfaces 320 or vice-versa.

The data store 318 may be any internal memory store providing a computer-readable medium such as a disk drive, an optical drive, a magnetic drive, a flash drive, or other device capable of providing mass storage for the computing device 310. The data store 318 may store computer readable instructions, data structures, program modules, and other data for the computing device 310 or computer system 300 in a non-volatile form for subsequent retrieval and use. The data store 318 may store computer executable code for an operating system, application programs, and other program modules, software objects, libraries, executables, and the like the like. The data store 318 may also store program data, databases, files, media, and so forth.

The input/output interface 320 may support input from and output to other devices that might couple to the computing device 310. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 316 for network communications is described separately from the input/output interface 320 for local device communications, these two interfaces may be the same, or may share functionality, such as where a USB port is used to attach to a WiFi accessory or other network interfacing device, or where an Ethernet connection is used to couple to a local network attached storage.

The peripherals 322 may include any device or combination of devices used to provide information to or receive information from the computing device 310. This may include human input/output (I/O) devices such as a keyboard, a mouse, a mouse pad, a track ball, a joystick, a microphone, a foot pedal, a camera, a touch screen, a scanner, or other device that might be employed by the user 330 to provide input to the computing device 310. This may also or instead include a display, a speaker, a printer, a projector, a headset or any other audiovisual device for presenting information to a user or otherwise providing machine-usable or human-usable output from the computing device 310. The peripheral 322 may also or instead include a digital signal processing device, an actuator, or other device to support control of or communication with other devices or components. Other I/O devices suitable for use as a peripheral 322 include haptic devices, three-dimensional rendering systems, augmented-reality displays, magnetic card readers, three-dimensional printers, computer-numerical controlled manufacturing machines and so forth. In one aspect, the peripheral 322 may serve as the network interface 316, such as with a USB device configured to provide communications via short range (e.g., Bluetooth, WiFi, Infrared, RF, or the like) or long range (e.g., cellular data or WiMax) communications protocols. In another aspect, the peripheral 322 may provide a device to augment operation of the computing device 310, such as a global positioning system (GPS) device, a security dongle, a projector, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 310 may be used as a peripheral 322 as contemplated herein.

Other hardware 326 may be incorporated into the computing device 310 such as a co-processor, a digital signal processing system, a math co-processor, a graphics engine, a video driver, and so forth. The other hardware 326 may also or instead include expanded input/output ports, extra memory, additional drives (e.g., a DVD drive or other accessory), and so forth.

A system bus 332 or combination of busses may serve as an electromechanical platform for interconnecting components of the computing device 310 such as the processor 312, memory 314, network interface 316, other hardware 326, data store 318, and input/output interface. As shown in the figure, each of the components of the computing device 310 may be interconnected using the system bus 332 or other communication mechanism for communicating information.

Methods and systems described herein can be realized using the processor 312 of the computer system 300 to execute one or more sequences of instructions contained in the memory 314 to perform predetermined tasks. In embodiments, the computing device 310 may be deployed as a number of parallel processors synchronized to execute code together for improved performance, or the computing device 310 may be realized in a virtualized environment where software on a hypervisor or other virtualization management facility emulates components of the computing device 310 as appropriate to reproduce some or all of the functions of a hardware instantiation of the computing device 310.

Figure 4:
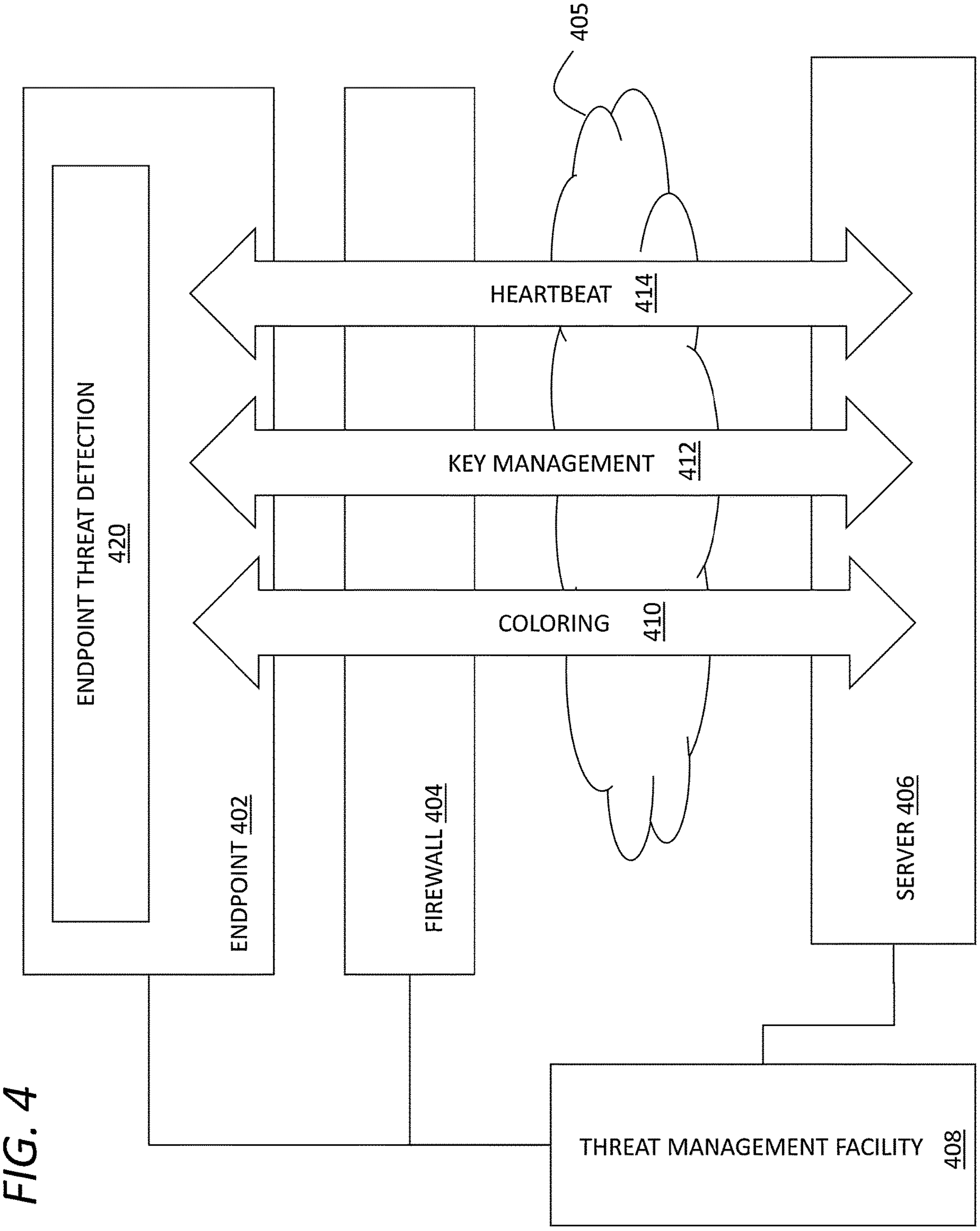
FIG. 4 illustrates a threat management system.

FIG. 4 illustrates a threat management system according to some implementations. In general, the system 400 may include an endpoint 402, a firewall 404, a server 406, and a threat management facility 408 coupled to one another directly or indirectly through a data network 405, all as generally described above. Each of the entities depicted in FIG. 4 may, for example, be implemented on one or more computing devices such as the computing device described above. A number of systems may be distributed across these various components to support threat detection, such as a coloring system 410, a key management system 412, and a heartbeat system 414 (or otherwise an endpoint health system), each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or 'color' software objects for improved tracking and detection of potentially harmful activity. The coloring system 410 may, for example, label files, executables, processes, network communications, data sources, and so forth with any suitable label. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, access by that process may be blocked (e.g., with access to keys revoked) in order to prevent, e.g., data leakage or other malicious activity.

The heartbeat system 414 may be used to provide periodic or aperiodic information from the endpoint 402 or other system components about system health, security, status, and so forth. The heartbeat system 414 or otherwise an endpoint health system may thus in general include a health status report system for the endpoint 402, such as through the use of a heartbeat system or the like. A heartbeat may be encrypted or plaintext, or some combination of these, and may be communicated unidirectionally (e.g., from the endpoint 402 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files, and a potential threat may be confirmed based on an interrupted heartbeat from the heartbeat system 414. The key management system 412 may then be deployed to revoke access by the process to certain resources (e.g., keys or file) so that no further files can be opened, deleted, or otherwise modified. More generally, the cooperation of these systems enables a wide variety of reactive measures that can improve detection and remediation of potential threats to an endpoint.

Figure 5:
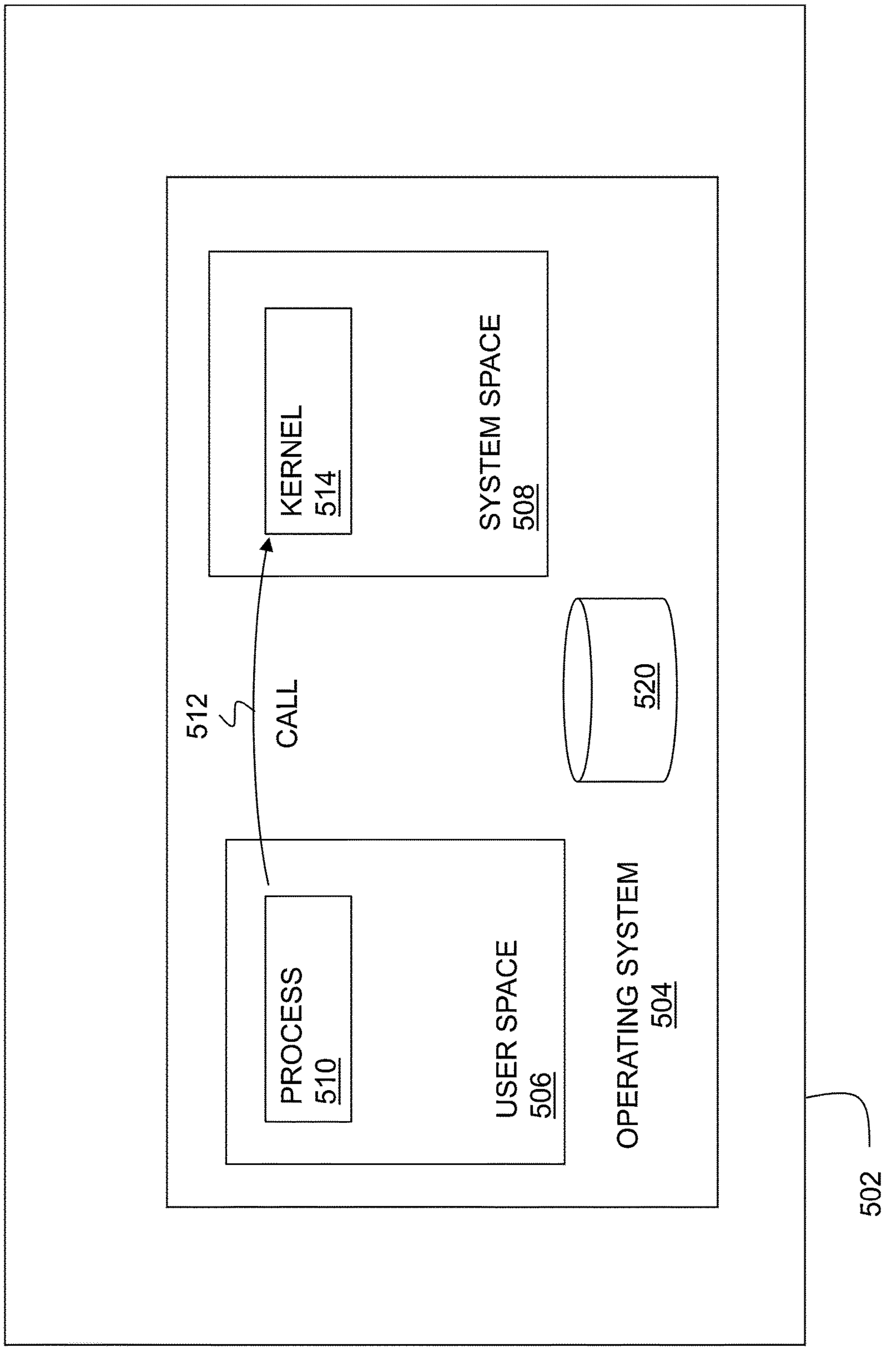
FIG. 5 shows a block diagram for a computing device.

FIG. 5 shows a block diagram of a computing system. In general, the system 500 may execute on any of the computing devices contemplated herein. For example, the system 500 may include a computing device 502 executing an operating system 504 with a user space 506 and a system space 508. According to general computing principles, the operating system 504 may include any system software that manages computer hardware and software resources and provides common service for computer programs such as input, output, memory allocation, and so forth. In general, an application will execute in the user space 506, e.g., as a process 510 (or multiple processes 510) and may function calls 512 into a kernel 514 executing in the system space 508 as needed. In one aspect relevant to the following disclosure, this may include memory related functions such as memory allocation and control over whether particular areas of memory are writeable or executable.

In one aspect, the computing device 502 may store information useful for executing low-level machine code in a data structure 520 such as a register, cache, memory, or the like.

Figure 6:
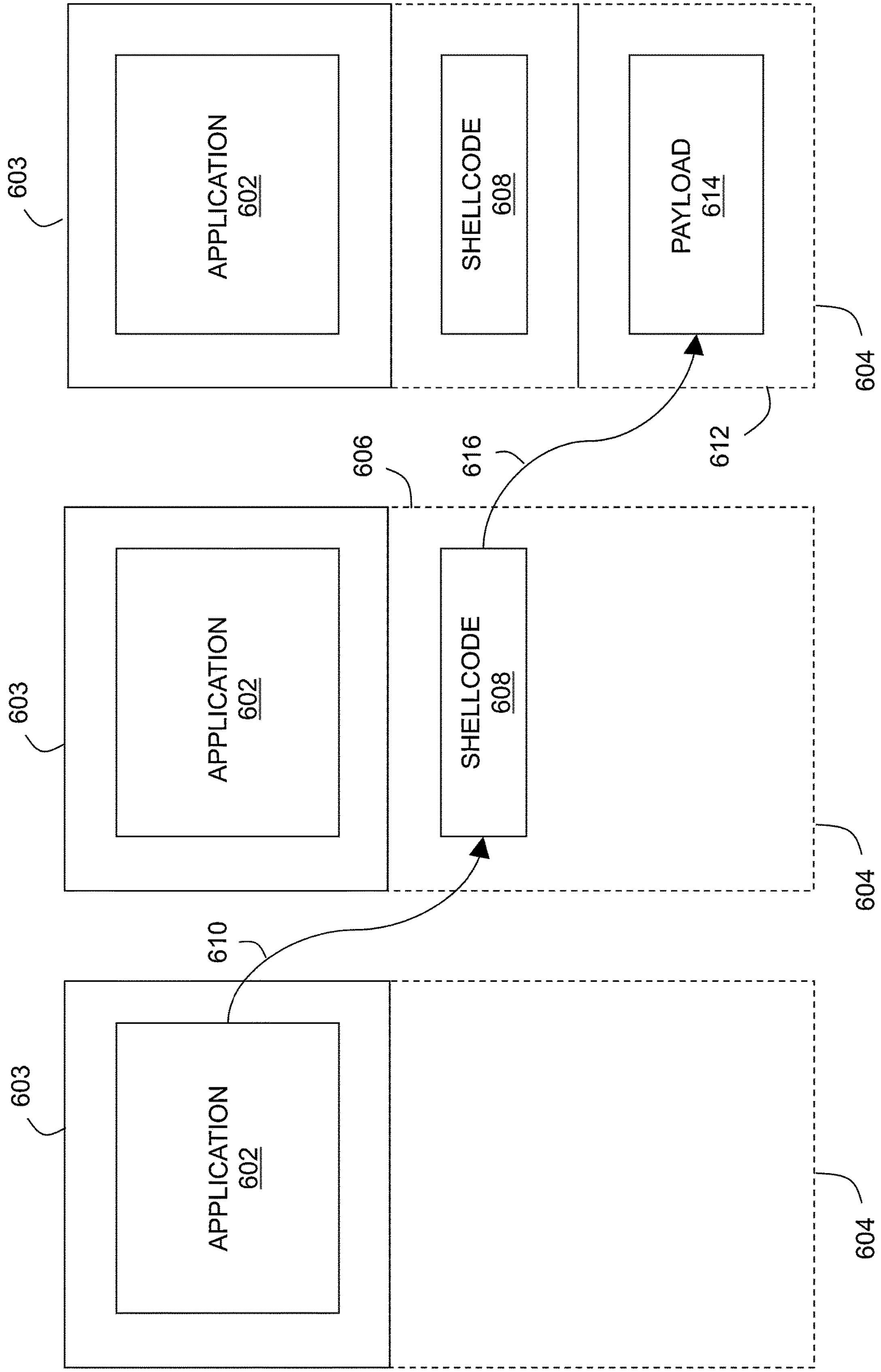
FIG. 6 illustrates a deployment of shellcode into executable heap memory.

FIG. 6 illustrates deployment of shellcode into executable heap memory. In general, this may include a first stage that does not appear malicious. Once executing in memory, this first stage can deploy additional code segments to achieve a final code objective. Malware deployed in this fashion may conceal intent with the first stage, while providing a backdoor for potential attackers to remotely access a programmatic interface for operating system services. This shell, which may include a command-line interface or a graphical user interface, can be used in furtherance of a malicious objective, e.g., by permitting deployment of shellcode within executable memory of a compromised device. While the first stage might be rearranged polymorphically to evade detection, the subsequent stages can be deployed completely in memory, beyond the reach of conventional disk-based antivirus defenses.

While difficult to detect with conventional antivirus tools, these exploits have a characteristic operational behavior amenable to detection based on runtime memory allocation. Specifically, these attacks typically employ an allocation of executable heap memory (or an allocation of heap memory with a subsequent permission change to make the allocated memory executable) from an application executing in heap memory, sometimes followed by a deployment of executable code into that allocated memory which itself allocates further executable memory that can then receive malicious executable code. In order to mitigate this type of malicious attack, calls to kernel memory management routines, particularly those that allocate memory and control memory permissions, can be detoured to a detection routine or the like to facilitate detection and mitigation at the time of the corresponding kernel calls, and potentially before the associated malicious code has a chance to execute.

FIG. 6 illustrates deployment of shellcode into executable heap memory. In general, this may include a first stage that does not appear malicious. Once executing in memory, this first stage can deploy additional code segments to achieve a final code objective. Malware deployed in this fashion may conceal intent with the first stage, while providing a backdoor for potential attackers to remotely access a programmatic interface for operating system services. This shell, which may include a command-line interface or a graphical user interface, can be used in furtherance of a malicious objective, e.g., by permitting deployment of shellcode within executable memory of a compromised device. While the first stage might be rearranged polymorphically to evade detection, the subsequent stages can be deployed completely in memory, beyond the reach of conventional disk-based antivirus defenses.

While difficult to detect with conventional antivirus tools, these exploits have a characteristic operational behavior amenable to detection based on runtime memory allocation. Specifically, these attacks typically employ an allocation of executable heap memory (or an allocation of heap memory with a subsequent permission change to make the allocated memory executable) from an application executing in heap memory, sometimes followed by a deployment of executable code into that allocated memory which itself allocates further executable memory that can then receive malicious executable code. In order to mitigate this type of malicious attack, calls to kernel memory management routines, particularly those that allocate memory and control memory permissions, can be detoured to a detection routine or the like to facilitate detection and mitigation at the time of the corresponding kernel calls, and potentially before the associated malicious code has a chance to execute.

As illustrated in FIG. 6, an application 602 may execute in from a memory 603 for a compute instance, such as any physical memory, program memory, disk, or the like. While depicted as an application 602, it will be understood that the executable code may also or instead include any type of application, process, code, routine, subroutine, library, script or the like that may be executed from the memory 603. This may also or instead include code executing within an application environment, such as an executable script within a document that is opened using a corresponding application. In general, for systems with security protections, this application 602 may have survived scrutiny by signature-based and/or machine learning detection techniques that run against code stored on a disk, and other antivirus or malware protection measures deployed on the compute instance.

The compute instance may also include a heap memory 604, which may generally include any heap or free store of memory, including physical memory and/or virtual memory, that can be allocated upon request within the computing instance, e.g., by calls to an operating system kernel. The heap memory 604 is typically, although not necessarily, globally available within a compute instance and variable in size, up to any physical memory limits of a particular computing context.

The application 602 (or other code or the like) may allocate memory 606 from the heap memory 604, make this memory 606 executable, and deploy an executable code segment such as shellcode 608 into the memory 606, as shown by the first arrow 610. This executable code segment may then allocate additional memory 612 from the heap memory 604, make this additional memory 612 executable, and then deploy a payload 614 such as malicious code into the additional memory 612, as shown by the second arrow 616. For example, the first executable code segment (shown as shellcode 608) may receive a second executable code segment (shown as payload 614) over a network or from a remote source. This second executable code segment may be received from a web site, remote data store, social media site, messaging system, or any other remote resource or the like through any suitable network communication. The payload 614 may also or instead be unpacked, decrypted, or otherwise generated or assembled from other data that is locally stored or received over the network prior to deployment within the heap memory 604. Thus, the payload 614 may be obfuscated, hidden, encoded, or encrypted to avoid local protections, network protections, and any other protections or combinations of the foregoing. In one aspect, when the payload 614 is received, the payload 614 may be transferred directly to the heap memory 604 for storage, e.g., in order to avoid malware protections on a file store.

It will be appreciated that memory may be made executable when allocated from the heap memory 604, or subsequently, e.g., with a kernel call that changes memory permissions. Thus, a detection technique for the relevant behaviors may usefully monitor both types of kernel calls. While a trusted application might deploy executable code in heap memory under various circumstances, it would be unusual for non-malicious code to deploy code that then creates additional executable memory to receive additional code. As such, a malware detection tool for detecting any corresponding pattern of memory allocation behaviors might usefully detect malicious payloads before they have a chance to execute on a compute instance.

Figure 7:
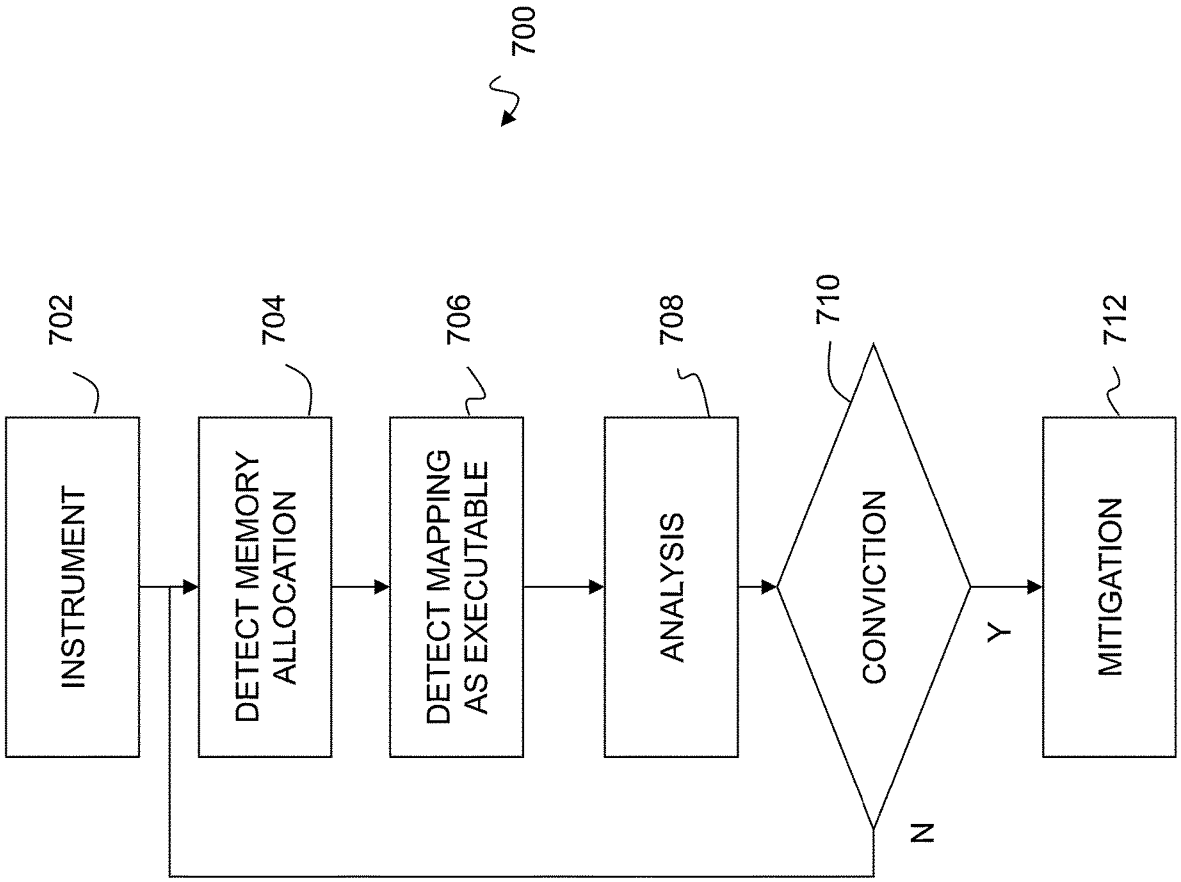
FIG. 7 is a flowchart of a process for dynamic shellcode mitigation.

FIG. 7 is a flowchart of a process for dynamic shellcode mitigation. According to the foregoing, a useful detection scheme may check for a combination of executable memory allocations corresponding to a dynamic shellcode attack. In general, this may include detecting code executing from heap memory that allocates additional heap memory and makes the additional heap memory executable.

As shown in step 702, the method 700 may begin with instrumenting a compute instance. In general, the compute instance may be any virtual or physical instance of a computing device such as an endpoint in an enterprise network, or any other computer, device, or the like that might benefit from malware detection as described herein. Instrumenting may, for example, include instrumenting a compute instance to detour a first kernel memory management routine for allocating memory to a first malware check and to detour a second kernel memory management routine for controlling memory permissions to a second malware check. The first malware check and the second malware check may be routines, processes, or the like configured to apply malware detection rules and responses as generally described herein. It will be appreciated that, where one of the malware checks is, e.g., a process, both malware checks may be, or may include, the same malware check or process.

The nature of the instrumentation may generally depend on the type of computing platform on which the instrumentation is deployed. For example, for the Windows™ operating system, heap memory allocations can be performed with a VirtualAlloc( ) call to the operating system, which reserves, commits, or changes the state of a region of pages in the virtual address space of a calling process according to parameters such as a size, an allocation type, and a memory protection constant. The memory protection constant specifies access privileges for the allocated memory, and permits a calling process to enable execute access to the committed memory upon allocation. Alternatively, the Windows™ operating system supports changes to the memory protection constant with a VirtualProtect( ) call. Thus, in one aspect, the first kernel memory management routine for allocating memory may include a VirtualAlloc( ) call of an operating system. A second kernel memory management routine for controlling memory permissions may include a VirtualProtect( ) call of an operating system. In an operating system where changes cannot be made to memory permissions after allocation, or where the desired detections are not otherwise based on changes to the permissions after an initial allocation, a single detour of memory allocation functions may suffice. Similarly, where a single kernel memory management routine supports initial allocations of memory and remapping of memory permissions, the instrumentation may detour this single function for purposes of detection. It will be appreciated that numerous other operating systems exist that use other function calls or names to control memory management. Any such operating systems and associated kernel functions that might usefully be instrumented to detect the memory management functions contemplated herein may be adapted for detection of malware using the foregoing methods, and are intended to fall within the scope of this disclosure.

As shown in step 704, the method may include detecting memory allocation, such as by detecting a memory allocation on a compute instance with a malware check, such as a memory allocation by program code executing on the compute instance. In one aspect, this may include detecting an allocation of memory in a heap memory by code executing in the heap memory, for example by detecting, with the first malware check described above, a memory allocation by a first code segment executing in a first memory range of a heap memory. More specifically, this may include a memory allocation that allocates a second memory range in the heap memory that contains the first code segment.

As shown in step 706, the method 700 may include detecting mapping of the allocated memory as executable. In this context, the term 'mapping' is intended to refer to any function that changes, controls, or includes a parameter controlling, protections on memory. This may for example include a declaration of access levels, e.g., when heap memory is allocated, or any change in protection on a region of memory after allocated from heap memory. For example, this may include detecting, with the first malware check described above, a memory mapping of the second memory range noted above as executable, such as by detecting a detoured call of a memory allocation function call, or more specifically detecting an allocation by the first kernel memory management routine that initially allocates the second memory range as executable. More generally, this may include any process for detecting a change in protection for the memory to executable, e.g., using the kernel memory management routine for controlling memory permissions. For example, this may include making memory executable for processes associated with users, groups, or types of processes.

Detecting a mapping as executable may also or instead include detecting, with the second malware check described above, a memory mapping of the second memory range as executable, e.g., by detecting a detoured call of a kernel function to change protection for the memory range, or more specifically detecting a change in protection to the second memory range with the second kernel memory management routine that includes changing the second memory range to executable. More generally, this may include detecting any function call or the like enabling execute access to a memory region committed by a previous allocation. In one aspect, detecting the change in protection may include detecting a change by the calling process that allocated the memory. In another aspect, detecting the change may include detecting the change by a second calling process different from a first calling process that allocated the second memory range with the first code segment. Detection of a malicious use of this latter technique may be more difficult where processes executing on the compute instance regularly change memory to executable for other, non-malicious purposes, in which case additional detection and analysis may be appropriate, e.g., to determine the nature of the second calling process that is changing the memory protection. In some cases, an attack may be carried out by a number of threads or processes, and so it may be that allocations and executable protection changes may appear to be initiated by the same process, or by different processes.

As shown in step 708, the method 700 may include analyzing the detected activity to identify malicious or potentially malicious code. This may include analyzing the detections from steps 704 and 706 using one or more rules to identify a pattern of potentially malicious activity such as a dynamic shellcode exploit. While the basic pattern is generally described herein, it will be understood that there may be additional information or analysis that increases or decreases the likelihood of malicious activity, any of which may be analyzed in this step.

For example, code that is image-based, e.g., that is obtained from a disk image of an executable or other file stored by a file system and loaded into memory for execution may generally be considered safe where it carries other objective indicia of trustworthiness, e.g., there is a hash or cryptographic signature availability to indicate trustworthiness. In some cases, it may nonetheless be useful to verify that executing code is the same as a trusted version, for example, that it has not been changed, that all of the program code in memory is the same as a trusted file source, etc. In another aspect, certain code, processes, applications, or the like may be explicitly whitelisted during detection of dynamic shellcode exploits, e.g., because the associated processes are known to allocate executable memory during normal operation in a manner that might otherwise produce false positives that interfere with malware detection.

In another aspect, certain factors may increase the likelihood of malicious activity. For example, where executable memory is allocated and receives executable code, and then this code allocates additional executable memory one or more times, this may be considered highly suspicious behavior intended, e.g., to obfuscate the nature and intent of executing code. Thus, in one aspect, analyzing detected activity may further include detecting a second memory allocation of a third memory range in the heap memory by a second code segment executing in the second memory range described above, or by the first code segment executing in the first memory range of the heap memory. More generally, analyzing may include evaluating a suspiciousness of the code based on a number or chain of allocations of executable memory from the code executing in the memory. For example, a pattern of heap memory allocations of executable memory that meets a threshold number of allocations, or that meets a threshold rate of allocations (e.g., a predetermined number of allocations within a predetermined time window) may be suspicious. Even for an application that has been whitelisted, an executable heap memory allocation pattern that is different from an expected pattern for trusted code may be suspicious.

In one aspect, analyzing may include scoring code based on the detection and/or other factors. For example, the trustworthiness of the process may be used in combination with the memory management detections described herein to generate an integrated score for trustworthiness. In another aspect, additional detections of suspicious memory management activity may be used to augment a score. Thus, for example, where numerous sequential or parallel allocations of executable memory occur (and optionally, deployment of code into same), these detections may be accumulated to provide a score indicative of a greater suspected risk. More generally, any risk management techniques based on, e.g., trustworthiness, computing context, behavior, and so forth may be used in combination with the techniques described herein to evaluate potential malware risks for a compute instance and/or an enterprise network associated with the compute instance.

As shown in step 710, the method 700 may include evaluating whether a conviction of malicious code can be reached, e.g., by identifying the code as suspicious based on the allocation and mapping described above. If the code cannot be convicted as malicious, then the method 700 may return to step 704 where additional detection may continue. If the code can be convicted as malicious, then the method 700 may proceed to step 712 where mitigation can occur. It will be understood that in instances of intermediate conviction, e.g., where there is not a sufficiently substantial likelihood of maliciousness or trustworthiness, then the code may be marked for additional, heightened monitoring until a more confident conviction can be achieved.

As shown in step 712, the method 700 may include mitigating detected code. For example, this may include, based on the detected memory allocation and the memory mapping, terminating execution of the first code segment described above (e.g., code executing in the heap that allocated new heap memory and made that new heap memory executable), such as by terminating a process associated with the first code segment. This may also or instead include intercepting behavior by the first code segment for malware mitigation based on the memory allocation, the memory mapping and the second memory allocation, either as a precursor to termination or for other labeling, observation, quarantine, or other remediation measures. This may also or instead include intercepting behavior by the first code segment for malware mitigation based on a chain of allocations of executable memory from the first code segment, or more generally, mitigating the code where the detection includes multiple sequential allocations and uses of executable memory. In another aspect, mitigation may be conditional, such as by withholding intercepting behavior by code executing in the memory when the code is associated with a whitelisted process.

While code termination may be an important form of intervention, other mitigation techniques may also or instead be used, either alone or in combination with termination of the offending code segment(s). For example, any processes or memory locations causally associated with the code, e.g., by acting on or being acted on by the relevant code, may be labeled as suspicious. These causally related computing objects may also or instead be terminated, deleted, or otherwise remediated. For example, a root cause analysis may be undertaken, e.g., to determine an initial event or root cause of the attack, and to determine related events and associated assets that may have been compromised. Code mitigation may also or instead include quarantine, observation or the like. In another aspect, the code or associated files or network streams may be colored to indicate suspiciousness, vulnerability, or potential compromise, and so forth so that other relevant rules can be applied based on this categorization. For example, in some cases, it may be determined that a vulnerability in an otherwise normal application was exploited in an attack that resulted in the deployment of malware code. Steps may be taken to update or otherwise protect the vulnerable application or to limit or more closely monitor the activity of the application. In another aspect, the code may be moved to a sandbox for execution and examination, or forwarded to a remote malware analysis resource for further review. More generally, any tools or resources for remediating malware, or an affected compute instance, may usefully be deployed upon the detection of actual or potential malware as contemplated herein.

According to the foregoing, there is also disclosed herein a system for dynamic shellcode mitigation. In general, the system may include a processor and a physical memory such as any of the processors and memories described herein. An operating system may be stored in the physical memory and configured to execute on the processor. The operating system may be more specifically configured to provide access to a heap memory by processes executing on the processor using a first kernel memory management routine for allocating memory and a second memory management routine for controlling memory permissions. A first malware check comprising computer executable code may also be stored in the physical memory and configured to receive a detour of kernel calls to a first kernel memory management routine for allocating memory and a second malware check configured to receive a detour of kernel calls to a second memory management routine for controlling memory permissions. The first malware check and the second malware check may be further configured to intercept behavior by code executing in the heap memory as malicious when the code allocates additional memory within the heap memory and enables execute access to the additional memory.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for malware mitigation based on runtime memory allocation behavior, the computer program product comprising computer executable code embodied in a non-transitory computer readable medium that, when executing on one or more computing devices, performs the steps of:

instrumenting a compute instance to detour kernel calls for memory management to a detection routine;

detecting, with a first malware check by the detection routine, a first kernel call by a first code segment to allocate a first memory range of a heap memory, wherein the first code segment is executing in the heap memory;

detecting, with a second malware check by the detection routine, a second kernel call to map the first memory range of the heap memory as executable; and in response to detecting the first kernel call to allocate the first memory range of the heap memory or the second kernel call to map the first memory range as executable, mitigating the first code segment on the compute instance.

2. The computer program product of claim 1, wherein mitigating the first code segment includes terminating a process associated with the first code segment.

3. The computer program product of claim 1, wherein mitigating the first code segment includes intercepting a behavior by the first code segment for malware mitigation.

4. The computer program product of claim 3, wherein intercepting the behavior includes intercepting the behavior based on the first kernel call to allocate the first memory range and the second kernel call to map the first memory range as executable.

5. The computer program product of claim 1, wherein mitigating the first code segment includes coloring the first code segment to indicate one or more of suspiciousness, vulnerability, or potential compromise.

6. The computer program product of claim 1, wherein mitigating the first code segment includes marking the first code segment for heightened monitoring.

7. The computer program product of claim 1, wherein mitigating the first code segment includes labeling one or more processes causally associated with the first code segment as suspicious.

8. The computer program product of claim 1, wherein mitigating the first code segment includes quarantining the first code segment.

9. The computer program product of claim 1, wherein mitigating the first code segment includes updating an application associated with the first code segment.

10. The computer program product of claim 1, wherein mitigating the first code segment includes performing a root cause analysis to determine an initial event associated with the first code segment.

11. A method comprising:

detecting, with a detection routine executing on a compute instance, at least one of an allocation of a memory range in a heap memory by a code segment executing in the heap memory and a mapping of the memory range as executable by the code segment executing in the heap memory;

identifying the code segment as suspicious based on the allocation of the memory range in the heap memory or the mapping of the memory range as executable by the code segment executing in the heap memory; and in response to identifying the code segment as suspicious, initiating a mitigation of the code segment.

12. The method of claim 11 further comprising instrumenting the compute instance to detour a call to a kernel memory management routine to the detection routine.

13. The method of claim 12 wherein detecting the allocation of the memory range includes detecting the allocation of the memory range on the compute instance with a call to the kernel memory management routine.

14. The method of claim 12 wherein detecting the mapping of the memory range as executable includes detecting the mapping of the memory range as executable with a call to the kernel memory management routine.

15. The method of claim 11 further comprising instrumenting the compute instance to detour a call to a kernel memory management routine for controlling memory permissions to a malware check of the detection routine.

16. The method of claim 15 wherein detecting the mapping of the memory range as executable includes detecting, with the detection routine, a kernel call to change protection for the memory range to executable using the kernel memory management routine for controlling the memory permissions.

17. The method of claim 11 wherein detecting the mapping of the memory range as executable includes detecting, with the detection routine, a kernel call to enable execute access to a memory region committed by the allocation.

18. The method of claim 11, wherein the mitigation includes intercepting a behavior by the code segment.

19. The method of claim 11, wherein the mitigation includes coloring the code segment to indicate one or more of suspiciousness, vulnerability, or potential compromise.

20. A system comprising:

a processor and a physical memory;

an operating system stored in the physical memory and configured to execute on the processor, the operating system configured to provide access to a heap memory including at least memory allocations of the heap memory and controlling memory permissions for the heap memory;

a detection routine executing on the processor and configured to detour memory management calls to a kernel of the operating system; and a malware detection process configured to initiate a mitigation of code executing in the heap memory when detecting with the detection routine at least one of the code allocating additional memory within the heap memory based on a first detour of at least one kernel call to allocate memory and the code enabling execute access to the additional memory based on a second detour of at least one other kernel call to control the memory permissions.

* * * * *